United States Patent Office 3,825,561
Patented July 23, 1974

1

3,825,561
FLUORAN COMPOUNDS
Takashi Akamatsu, Ashiya, Koichi Koga, Toyonaka, Mitsuru Kondo, Kawanishi, Makoto Miyake, Nishinomiya, and Hiroshi Iwasaki, Takatsuki, Japan, assignors to Sumitomo Chemical Company, Higashi-ku, Osaka, and Paper Manufacturing Co., Ltd., Chuo-ku, Tokyo, Japan
No Drawing. Filed Oct. 8, 1971, Ser. No. 187,919
Claims priority, application Japan, Oct. 12, 1970, 45/90,181; Nov. 11, 1970, 45/99,663; Dec. 25, 1970, 45/129,020; Dec. 26, 1970, 45/130,393; Dec. 29, 1970, 46/124,393; Apr. 15, 1971, 46/24371
Int. Cl. C07d 7/42
U.S. Cl. 260—335                 7 Clams

ABSTRACT OF THE DISCLOSURE

Novel fluoran derivatives such as, for example, 2-diallylamino - 6 - diethylaminofluoran, 2,2'-iminobis(6-diethylaminofluoran), 2-[bis(p - chlorobenzyl)amino]-6-dimethylaminofluoran, 2-(o-chlorobenzylamino) - 6 - diethylaminofluoran, and 2-(N - phenyl-N-allylamino-6-dimethylaminofluoran. These fluoran derivatives are useful as a coloring material for record material systems, such as pressure-sensitive copying paper or heat-sensitive copying paper, wherein colored images formed by an electron-donor-acceptor color-forming reaction between coloring material and acidic material.

This invention relates to chromogenic compounds for use in recording sheet which develops color images by an electron donor-acceptor color-forming reaction between chromogenic material and acidic material which react upon contact to produce a color. More specifically, this invention relates to fluoran derivatives represented by the following general formula (I), (II), (III) and (IV), methods for preparation thereof, methods for application thereof as a coloring material, and to the sheet wherein these compounds are used as a coloring material.

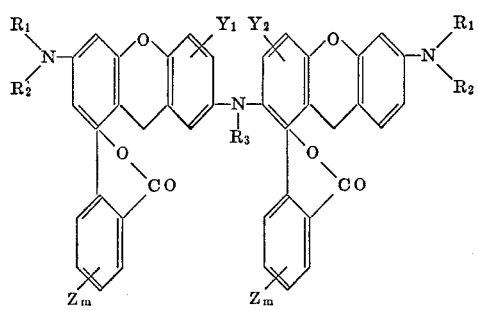

(I)

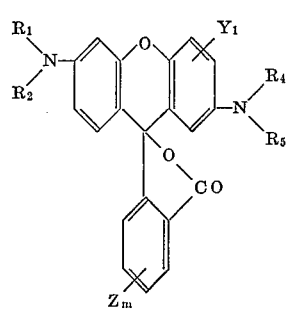

(II)

2

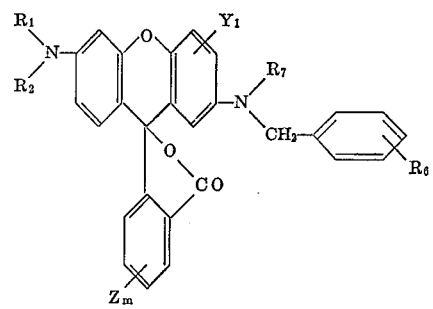

(III)

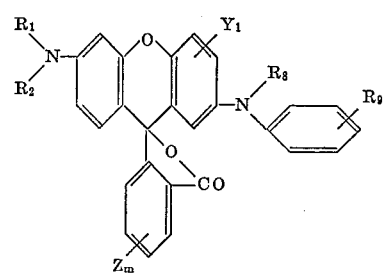

(IV)

In the above general formulas, $Y_1$ and $Y_2$ represent hydrogen atom or lower alkyl ($C_1$–$C_4$), lower alkoxy ($C_1$–$C_4$), halogen, amino, lower alkyl-substituted amino, or nitro group; Z represents hydrogen atom or lower alkyl ($C_1$–$C_4$), halogen, lower alkoxy ($C_1$–$C_4$), amino, lower alkyl-substituted amino, nitro group or

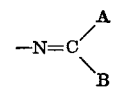

[where A and B are hydrogen, lower alkyl ($C_1$–$C_4$), phenyl, halophenyl, tolyl, methoxyphenyl or nitrophenyl]; and $m$ represents an integer from 1 to 4, $R_1$ and $R_2$ represent hydrogen atoms; lower alkyl ($C_1$–$C_4$) groups such as methyl, ethyl, propyl and butyl; lower alkoxyalkyl (alkyls each having $C_1$–$C_4$) groups such as methoxymethyl, methoxyethyl, methoxypropyl, methoxybutyl, ethoxymethyl, ethoxyethyl, ethoxypropyl, propoxymethyl, propoxyethyl, propoxypropyl, propoxybutyl, butoxymethyl, butoxyethyl, butoxypropyl and butoxybutyl; lower haloalkyl ($C_1$–$C_4$) groups such as chloromethyl, bromomethyl, chloroethyl, bromoethyl, chloropropyl, bromopropyl, chlorobutyl and bromobutyl; or unsubstituted or halo-, alkoxy-, nitro- or alkyl-substituted benzyl groups; $R_3$ represents hydrogen atom or lower alkyl ($C_1$–$C_4$), alkoxyalkyl ($C_1$–$C_4$), hydroxyalkyl ($C_1$–$C_4$), haloalkyl ($C_1$–$C_4$), cyanoalkyl ($C_1$–$C_4$), carbamoyl ($C_1$–$C_4$), alkenyl ($C_1$–$C_4$), alkynyl ($C_1$–$C_4$),

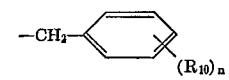

[where $R_{10}$ is hydrogen, lower alkyl ($C_1$–$C_4$), haloalkyl ($C_1$–$C_4$), acyl ($C_1$–$C_4$), alkoxy ($C_1$–$C_4$), nitro, halogen such as F, Cl, Br or I, alkoxycarbonyl ($C_1$–$C_4$), alkanesulfonyl ($C_1$–$C_4$), benzenesulfonyl, toluenesulfonyl, halobenzenesulfonyl, or methoxybenzenesulfonyl],

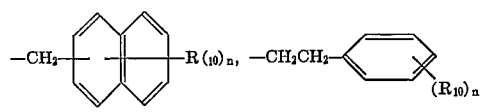

(where $R_{10}$ is as defined above and $n$ is an integer of 1 to 7), —$CH_2CH=CH\!\!+\!\!R_{12}$ [where $R_{12}$ is hydrogen, lower alkyl ($C_1$–$C_4$), haloalkyl, halophenyl, tolyl, methoxyphenyl, or nitrophenyl], —$CH_2$—$C\equiv CH\!\!+\!\!R_{12}$ (where $R_{12}$ is as defined above), —$COR_{13}$ [where $R_{13}$ is alkyl ($C_1$–

$C_4$), alkenyl ($C_1$–$C_4$), alkynyl ($C_1$–$C_4$), haloalkyl or alkoxyalkyl], —$SO_2R_{13}$ (where $R_{13}$ is as defined above),

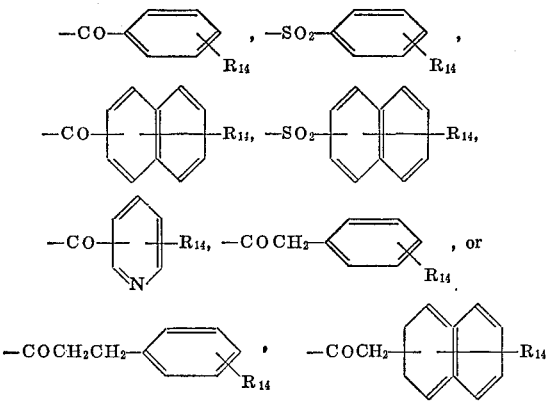

[where $R_{14}$ is hydrogen, alkyl ($C_1$–$C_4$), alkoxy ($C_1$–$C_4$), halogen or nitro], $R_4$ and $R_5$ represent simultaneously —$CH_2CH=CH_2\!\!+\!\!R_{12}$ or —$CH_2C\equiv CH\!\!+\!\!R_{12}$ where $R_{12}$ is as defined above, when either one of $R_4$ and $R_5$ is —$CH_2C\equiv CH\!\!+\!\!R_{12}$, (wherein $R_{12}$ is as defined above), or phenethyl, the other represents hydrogen or lower alkyl; $R_6$ represents hydrogen lower alkyl, halogen, nitro, lower alkoxy, phenyl or phenoxy group; $R_7$ represents hydrogen atom, lower alkyl group or

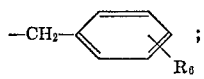

any two of $Y_1$, $R_6$ and $R_7$ are not simultaneously hydrogen atoms; $R_8$ represents hydrogen atom or lower alkyl ($C_1$–$C_4$), alkoxyalkyl ($C_1$–$C_4$), hydroxyalkyl ($C_1$–$C_4$), haloalkyl ($C_1$–$C_4$), cyanoalkyl ($C_1$–$C_4$), carbamoyl ($C_1$–$C_4$), alkenyl ($C_1$–$C_4$), alkynyl ($C_1$–$C_4$),

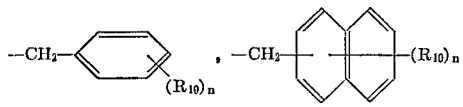

(where $R_{10}$ and $n$ are as defined above),

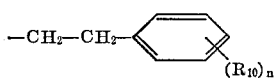

(where $R_{10}$ and $n$ are as defined above),

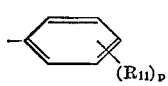

[where $R_{11}$ is hydrogen, lower alkyl ($C_1$–$C_4$), lower alkoxy ($C_1$–$C_4$), halogen, nitro, or alkyl-substituted amino and, P is an integer of 1 to 5],

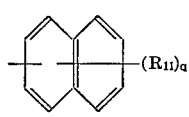

(where $R_{11}$ is as defined above and $q$ is an integer of 1 to 7) —$CH_2CH=CH_2\!\!+\!\!R_{12}$, —$CH_2\!\!-\!\!C\equiv CH\!\!+\!\!R_{12}$ (where $R_{12}$ is as defined above), —$COR_{13}$, —$SO_2R_{13}$ (where $R_{13}$ is as defined above),

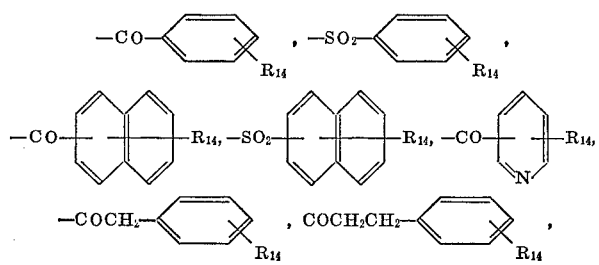

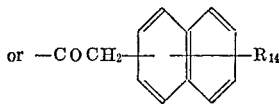

($R_{14}$ is as defined above); $R_9$ represents hydrogen atom or lower alkoxy group (provided that $R_8$ is neither hydrogen nor lower alkyl when $R_9$ and $Y_1$ are hydrogen atoms).

Above chromogenic compounds of this invention have the form of substantially colorless or slightly colored solids, or approach a colorless state when in liquid solution, but which assume a clearly colored state upon reactive contact with acidic material. As used in mark-forming systems, marking in desired areas on support webs or sheets may be accomplished by effecting localized reactive contact between the chromogenic material and the acidic material on or in such web or sheet, such chromogenic material being brought thereto by transfer, or already present therein, the reactive contact forming a clear coloration in the intended image-marking areas.

There have already been known several types of recording system utilizing an electron donor-acceptor color-forming reaction chromogenic material and acidic material.

The pressure-sensitive recording systems generally comprise color-forming components on and/or within one or more sheet supports, the color-forming components being isolated from one another by a pressure-rupturable barrier. Where the color-forming components are disposed on separate sheets as disclosed in U.S. Pat. No. 2,712,507, the record material referred to as a "transfer" or "couplet" system. In such systems, a solution of a chromogenic material is held in rupturable microscopic capsules coated onto one surface of a transfer sheet, while an adjacent receiving sheet is sensitized with an acidic material, i.e. an electron acceptor. Most common acidic materials are activated acid clay and acid clays, such as attapulgite, zeolite, bentonite, kaolin and silica. Recently, monomeric phenols or acid reactant polymeric materials, such as phenolic polymers, phenol acetylene polymers, maleic acid-rosin resins, have been suggested either alone or in combination with acid clays.

In the manufacturing method of such record material, for instance, a non-volatile oil containing a chromogenic material dissolved therein is protected by encapsulation with coacervate film of a water-soluble polymer. The resulting coating composition containing capsules dispersed therein are coated on one side of a sheet, and coating composition of said electron acceptors is coated on the other side of the sheet. When several sheets are laid one over another and impressed with a pencil or the like, capsules are collapsed to release the oil containing chromogenic material which produces a duplicated image on contact with the electron-acceptor. In another system, as disclosed in U.S. Pat. No. 2,730,457, a coating liquid containing both of the capsules of chromogenic material and acidic material is applied on one side of a sheet, or alternatively, a coating containing capsules is first applied on one side of a sheet and the second coating containing the electron-acceptor is applied thereon. Thus, all the components are disposed on a single sheet, the record material is referred to as "self contained" system and develops image color at the pressure is applied.

As a modificaton of pressure-sensitive marking system, Japanese Pat. No. 511,757 (corresponds to U.S. Patent Application Ser. No. 392,404, filed in Aug. 27, 1964) discloses a recording sheet, in which minute capsules containing liquid solvent are coated on one surface of a sheet support and both of the chromogenic material and the acidic polymer is coated on or impregnated in the same sheet or another sheet in solid condition.

There is thermo-responsive record sheet as a mark-forming system utilizing an electron donor-acceptor color-forming reaction. For example, Japanese Pat. No. 45–14039 (corresponds to U.S. Patent Application Ser. No.

554,565 filed in June 1, 1966) discloses a temperature-responsive record material comprising a supporting sheet material having crystal violet lactone and a phenolic material solid at room temperature but capable of liquefying and/or vaporizing at normal thermographic temperatures, said lactone and phenolic material being further capable of producing a mark-forming reaction upon reactive contact.

The novel compounds of our invention are widely used for the above-mentioned mark-forming systems as a colorless chromogenic compound, i.e. an electron donor, and gives many excellent advantages. The coloring materials (chromogenic materials) generally used are triphenylmethane derivatives including Crystal Violet lactone, or 2-methyl-6-diethylaminofluoran. These pressure-sensitive coloring materials instantly turn from colorless into clear bluish violet or red on contact with an acidic electron-acceptor.

However, when used in a pressure sensitive paper, these coloring materials reveal such a defect that owing to their extremely poor fastness to sunlight, the color of the developed image of the impressed letters fades away in a short period on exposure to sunlight or ultraviolet rays. Further, opening of the lactone ring in a triphenylmethane lactone is prevented by the presence of water, and the opened lactone ring tends to be closed again in the presence of moisture, resulting in disappearance of the developed image.

A recording sheet capable of producing an image in black has recently been developed to be used as an original drawing for making diazo-type copies. In the process of manufacturing said recording sheet, as the coloring material, a mixture of several coloring materials has to be used. Hence, the process has several disadvantages such as complication in preparing the coating material, requirement for an advanced technique, and poor durability of black color of the image because of unsatisfactory moisture resistance and light fastness of some coloring materials in the mixture.

An object of this invention is to improve the recording sheet by eliminating defects of conventional recording sheet.

The present fluoran compounds represented by the formulas (I), (II), (III) and (IV) are colorless and stable in air at ordinary temperature.

The aforementioned fluoran derivatives are readily soluble in non-polar and non-volatile oils such as olive oil, castor oil, paraffin oils, chlorinated diphenyls, chlorinated paraffins, tricresyl phosphate, and dialkylnaphthalenes such as diisopropylnaphthalene. The present fluoran derivatives are especially soluble in diisopropylnaphthalene, the most common aromatic non-volatile oil, so that variation of the concentration of coloring materials in solution is easily achieved.

The present fluoran compounds have high color-developing speed. Such color formation occurs just at once when the fluoran compounds in the form of crystals or a solution in the above-cited solvents are brought into contact with the acidic electron-acceptor. Then, the recording sheet prepared with the present fluoran compounds gives vivid deep images on the paper at the moment when a pressure or impact is applied onto the paper by means of a pencil, a ball-point pen or a typewriter.

The compounds of the present invention develop all kinds of colors. When a solution of the present compounds in an aforementioned non-polar, non-volatile solvent is contacted with an acidic electron-accepting substance such as acid clay, silica gel, activated acid clay, p-phenylphenol-formaldehyde resin, p - cyclohexylphenol-formaldehyde resin, or the like, color is developed instantaneously and the solution turns into dark red, dark reddish violet, dark green, dark blue, greenish black, or bluish black. Owing to excellent resistances against water and light, the resulting colored image neither fades nor discolors upon exposure to light or contact with water or humid air. Hence, the present sheet is distinguished in preserving images of the letters for a long time without change in color.

Colors depend upon the number and type of the substituent in the fluoran nucleus. In the conventional process for making a black-image sheet, there has been used a mixture of various compounds such as Crystal Violet lactone which is a blue coloring material, 3-diethylamino-7-methylfluoran which is a red coloring material and the like. Coloring materials of different basic structures show different rate of color development on contact with an electron acceptor, resulting in change of the image color with lapse of time, in such a manner that the image color changes, for example, from reddish black to black. In the case where the present compounds are used, a recording sheet giving a black image can be made by use of a mixture of relatively small number of suitably selected compounds capable of producing dark colors, or by additional use of a small amount of a suitable coloring material for modifying the color. In such a mixture, each coloring material has the same basic structure and hence the difference in deepness of color shade among compounds becomes small. The distinguished advantage of such a recording sheet is reduced change in color tone of the image with lapse of time after impression with a pencil or typewriter.

The fluoran derivatives of this invention having the above-mentioned remarkable characteristics are synthesized by way of the following representative routes.

In the first method, at first a m-aminophenol derivative (V) is condensed by dehydration with a phthalic anhydride derivative (VI) to form a 2-(4'-amino-2'-hydroxybenzoyl)benzoic acid derivative (VII) according to the following scheme:

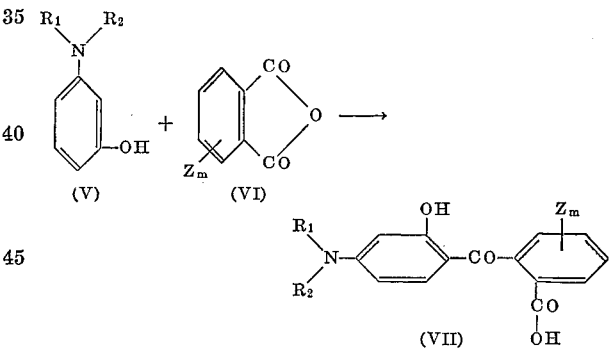

wherein $R_1$, $R_2$, Z and $m$ are the same as defined above. The resulting 2-(4'amino - 2' - hydroxybenzoyl)benzoic acid derivative (VII) is condensed by dehydration with a phenol derivative (VIII) by heating at 0° to 180° C. for several hours to several days in the presence of, if necessary, a solvent and a dehydrating condensation agent. After completion of the reaction, the reaction product is poured into ice water to undergo hydrolysis, freed from, if necessary, the solvent, and neutralized, if necessary, with sodium hydroxide or potassium hydroxide at room temperature to precipitate a solid, which is collected by filtration to obtain a colored compound (IX) having a lactone ring opened.

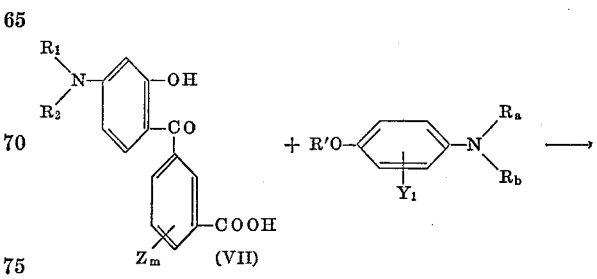

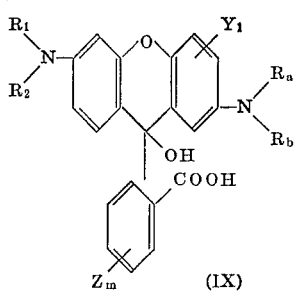

(IX)

In the above formulas, $R_a$ and $R_b$ represent $R_4$, $R_5$, $R_6$, $R_7$, $R_8$,

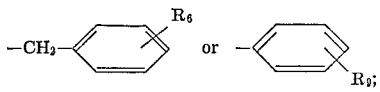

$R_1$, $R_2$, $R_3$, $R_4$, $R_5$, $R_6$, $R_6$, $R_7$, $R_8$, $R_9$, $Y_1$, $Z$ and $m$ have the same meaning as defined above; and $R'$ represents hydrogen atom or lower alkyl group.

Useful dehydrating condensation agents are sulfuric acid, phosphorus pentoxide, phosphoric acid, polyphosphoric acid; anhydrous metal chlorides such as tin chloride, zinc chloride, aluminum chloride and iron chloride; phosphorus trichloride and phosphorus pentachloride. If necessary, carbon disulfide, chlorinated benzenes, and nitrobenzene are used as a solvent.

The open lactone ring in the resulting 9-(2'-carboxyphenyl)-2,6-diaminoxanthhydrol (IX) can be closed by heating in a solvent to form a fluoran derivative (X) which is isolated on cooling as white crystals.

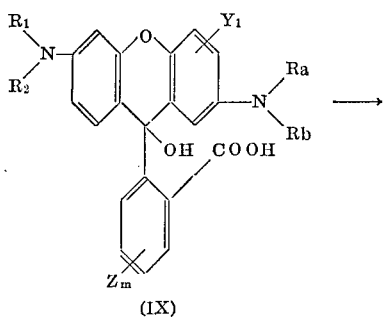

(IX)

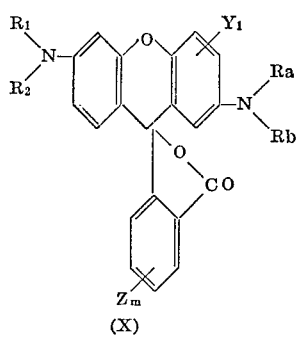

(X)

In the above formulas, $R_1$, $R_2$, $R_a$, $R_b$, $Y_1$, $Z$ and $m$ have the same meaning as defined above.

Useful solvents for cyclization include aromatic hydrocarbon solvents such as benzene and xylene; ring-halogenated aromatic hydrocarbon solvents such as chlorobenzene, bromobenzene, dichlorobenzenes, and trichlorobenzenes; alcohols such as methanol and ethanol; amide-type solvents such as dimethylformamide and diethylformamide; sulfoxide-type solvents such as dimethyl sulfoxide and diethyl sulfoxide; aliphatic hydrocarbon solvents such as n-hexane and cyclohexane; halogenated aliphatic hydrocarbon solvents such as chloroform, bromoform and methylchloroform; and ethers such as dimethylether and diethyl ether.

The cyclization reaction is sometimes facilitated by the addition of aliphatic amines such as dimethylamine, trimethylamine, diethylamine and triethylamine; aliphatic aminoalcohols such as ethanolamines and propanolamines; or heterocyclic baric compounds such as pyridine and picolines.

The crystals precipitated on cooling in the above-said cyclizing solvents or a mixture thereof, are collected by filtration, and washed with a nonpolar solvent for the crystals, such as cyclohexane, n-hexane or diethyl ether, to obtain a colorless compound (X). In some cases, compounds having a stable lactone ring can be obtained as white crystals from the acidic solution of hydrochloric acid or sulfuric acid by simple neutralization with sodium hydroxide or potassium hydroxide.

In the second method according to this invention, a bis-compound (I) is obtained in a manner similar to that in the first method by condensing a p,p'-dihydroxy-diphenylamine derivative (XI) with a 2-(2'-hydroxy-4'-aminobenzoyl)benzoic acid derivative (VII) in the presence of the above-mentioned dehydrating agent, and then subjecting the reaction product to after-treatment and cyclization.

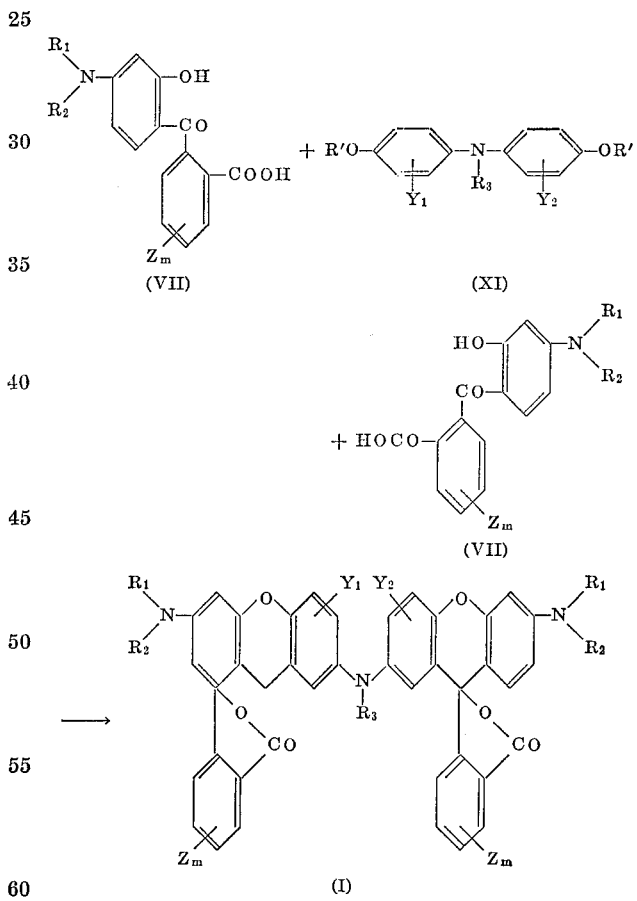

In the above formulas, $R'$, $R_1$, $R_2$, $R_3$, $Y_1$, $Y_2$, $Z$ and $m$ have the same meaning as defined above.

In the third method according to this invention, at first a fluoran derivative, (XII), (XIII) or (XIV), is synthesized in a manner similar to that in the first or second method, and the resulting fluoran derivative is then reacted with an alkylating, acylating or sulfonylating agent at 0° to 150° C. for several hours, in the presence of, if necessary, a solvent and an acid-removing agent, to obtain the intended fluoran derivative, (XV), (XVI) or (I). Treatment of the reaction product and cyclization are carried out in a manner similar to that in the first method.

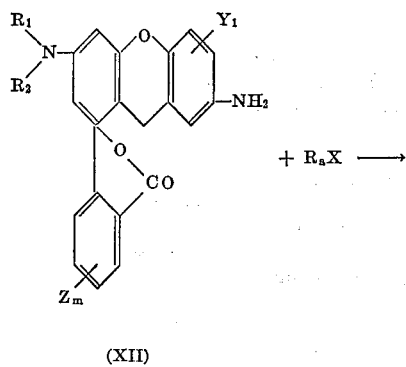

(XII) + R_aX →

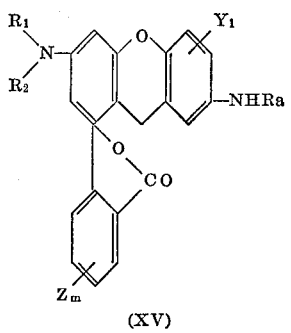

(XV)

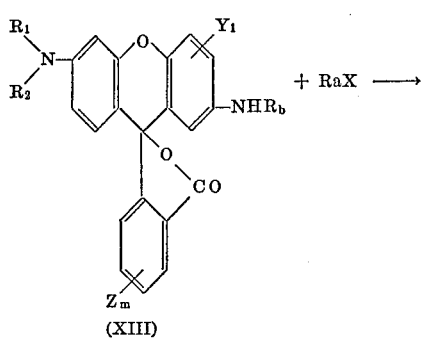

(XIII) + R_aX →

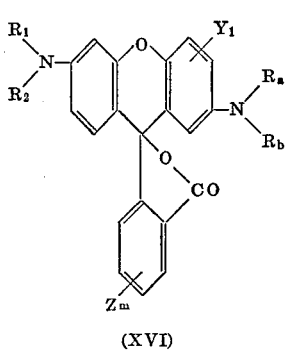

(XVI)

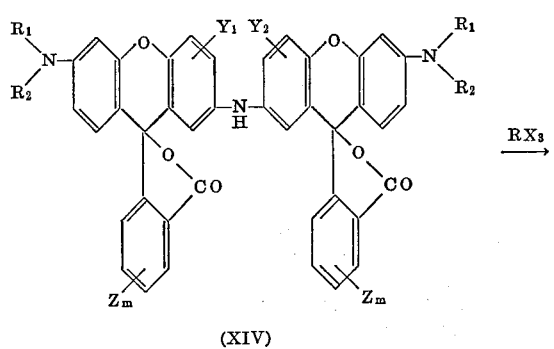

(XIV)

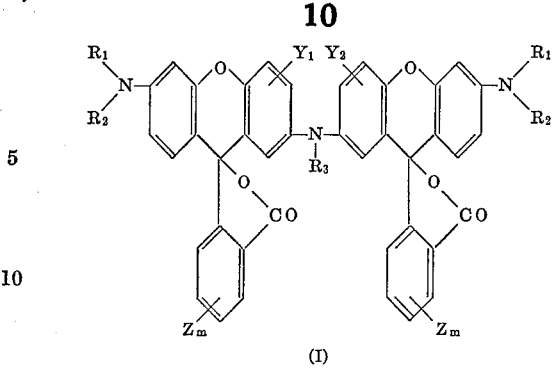

(I)

In the above formulas, $R_1$, $R_2$, $R_3$, $R_a$, $R_b$, Z, $m$, $Y_1$ and $Y_2$ have the same meaning as defined above and X means halogen atoms such as chlorine and bromine; hydroxyl; sulfate radical represented by $SO_4^=$ and $R_2SO_4^-$; phosphate radical represented by $PO_4^{---}$, $R_2PO_4^=$ and $R_2R_2PO_4^-$; sulfonyloxy; acyloxy; benzoyloxy or reactive double bond.

In the above-said reaction, are used the following alkylating, acylating or sulfonylating agents:

(1) Acetic anhydride, butyric anhydride, propiolic anhydride, crotonic anhydride, benzoic anhydride, p-chlorobenzoic anhydride, o-chlorobenzoic anhydride, m-nitrobenzoic anhydride, m-bromobenzoic anhydride, p-methylbenzoic anhydride, o-methylbenzoic anhydride, m-methoxybenzoic anhydride.

(2) Acetyl chloride, propionyl chloride, acryloyl chloride, methacryloyl chloride, acetyl bromide, propionyl bromide, propioloyl bromide, crotonoyl bromide, benzoyl chloride, m-chlorobenzoyl chloride, p-nitrobenzoyl chloride, o-nitrobenzoyl chloride, m-bromobenzoyl chloride, p-methylbenzoyl chloride, o-methylbenzoyl chloride, m-methoxybenzoyl chloride, benzoyl bromide, m-chlorobenzoyl bromide, p-nitrobenzoyl bromide, o-nitrobenzoyl bromide, m-bromobenzoyl bromide, p-methylbenzoyl bromide, o-methylbenzoyl bromide, m-methoxybenzoyl bromide.

The following compounds are preferable as alkylating agents.

(3) Esters: dimethyl sulfate, diethyl sulfate, trimethyl phosphate, triethyl phosphate, methyl benzenesulfonate, ethyl benzenesulfonate, methyl p-toluenesulfonate, ethyl p-toluenesulfonate, propyl p-toluenesulfonate, methoxyethyl p-toluenesulfonate, methyl methanesulfonate, propyl methanesulfonate.

(4) Aliphatic lower alkyl halides: methyl chloride; methyl bromide, ethyl chloride, ethyl bromide, propyl chloride, butyl chloride.

(5) Benzyl halides: benzyl chloride, p-nitrobenzyl chloride, o-nitrobenzyl chloride, m-chlorobenzyl chloride, p-bromobenzyl chloride, o-bromobenzyl chloride, m-methylbenzyl chloride, m-methoxybenzyl chloride, benzyl bromide, m-nitrobenzyl bromide, p-chlorobenzyl bromide, o-chlorobenzyl bromide, m-bromobenzyl bromide, p-methylbenzyl bromide, o-methylbenzyl bromide, m-methoxybenzyl bromide.

(6) Allyl halides: allyl chloride, allyl bromide, 2-methylallyl bromide, 2-ethylally bromide, 2-butyny bromide, cinnamyl bromide.

(7) Propargyl derivatives: propargyl chloride, propargyl bromide, 2-butynyl bromide, 2-pentynyl bromide.

(8) Acrylonitrile, acrylamide.

(9) Sulfonylating agents: methanesulfonyl chloride, ethanesulfonyl chloride, butanesulfonyl chloride, benzenesulfonyl chloride, p-toluenesulfonyl chloride, o-toluenesulfonyl chloride, m-chlorobenzenesulfonyl chloride, m-nitrobenzenesulfonyl chloride, o-nitrobenzenesulfonyl chloride, m-methoxybenzenesulfonyl chloride; bromide alternatives of these compounds such as, for example, methanesulfonyl bromide, ethanesulfonyl bromide, benzenesulfonyl bromide, p-chlorobenzenesulfonyl bromide, p-nitrobenzenesulfonyl bromide.

Suitable acid-removing agents are sodium hydrogencarbonate, potassium hydrogencarbonate, potassium carbonate, sodium carbonate, sodium acetate, potassium acetate, and, if possible under the reaction conditions, those basic compounds which are used in cyclization.

Suitable solvents include aromatic hydrocarbon solvents such as benzene and xylene; halogenated aliphatic hydrocarbon solvents such as chloroform, bromoform and methylchloroform; halogenated aromatic hydrocarbon solvents such as chlorobenzene, bromobenzene and dichlorobenzenes; alcohol solvents such as methanol, ethanol and propanol; ether solvents such as diethyl ether, dimethylene glycol dimethyl ether, and diethylene glycol dimethyl ether; sulfoxide-type solvents such as dimethyl sulfoxide and diethyl sulfoxide; and amide-type solvents such as N,N-diethylformamide and dimethyl acetamide.

By the above-mentioned methods, there are formed compounds of this invention, represented by the general formulas, (I), (II), (III) and (IV), including the following individual compounds, which have good stability against both water and light and a rapid rate of color development. The developed color on silica gel is given in the following at right side of the name of corresponding compound.

| Name of the compound: | Color |
|---|---|
| 2-Diallylamino-6-dimethylaminofluoran | Dark green. |
| 2-Diallylamino-6-diethylaminofluoran | Green. |
| 2-Dipropargylamino-6-dimethylaminofluoran | Red. |
| 2-Dipropargylamino-6-diethylaminofluoran | Do. |
| 2-Propargylamino-6-diethylaminofluoran | Dark green. |
| 2-Di(3-phenylpropargylamino)-6-diethylaminofluoran | Green. |
| 2-(Cinnamylamino)-6-diethylaminofluoran | Greenish black. |
| 2-Di(cinnamylamino)-6-dimethylaminofluoran | Do. |
| 2-Propargylamino-6-dimethylaminofluoran | Do. |
| 2-(3'-Phenylpropargylamino)-6-dimethylaminofluoran | Do. |
| 2-(Cinnamylamino)-6-dimethylaminofluoran | Do. |
| 2-Di(cinnamylamino)-6-dimethylaminofluoran | Do. |
| 2-Propargylamino-4-methyl-6-diethylaminofluoran | Do. |
| 2-Di(cinnamylamino)-4-methyl-6-diethylaminofluoran | Do. |
| 2-Di(3'-phenylpropargylamino)-3-methyl-6-diethylaminofluoran | Dark red. |
| 2-Di(cinnamylamino)-3-methyl-6-diethylaminofluoran | Do. |
| 2-Di(3'-phenylpropargylamino)-3-methyl-6-dimethylaminofluoran | Red. |
| 2-(Cinnamylallylamino)-3-methyl-6-dimethylaminofluoran | Reddish black. |
| 2-Di(cinnamylallylamino)-3-methyl-6-dimethylaminofluoran | Dark red. |
| 2-Di(cinnamylamino)-4-chloro-6-diethylaminofluoran | Blackish green. |
| 2-Di(cinnamylallylamino)-4-chloro-6-dimethylaminofluoran | Do. |
| 2-Di(3'-phenylpropargylamino)-3-chloro-6-dimethylaminofluoran | Red. |
| 2-Di(cinnamylamino)-3-chloro-6-diethylaminofluoran | Dark red. |
| 2-Di(cinnamylamino)-3-bromo-6-diethylaminofluoran | Do. |
| 2-Di(cinnamylamino)-4-methoxy-6-diethylaminofluoran | Green. |
| 2-Propargylamino-4-ethoxy-6-diethylaminofluoran | Greenish black. |
| 2-Di(3-phenylpropargylamino)-4-ethoxy-6-dimethylaminofluoran | Green. |
| 2-Propargylamino-3-ethoxy-6-diethylaminofluoran | Violet red. |
| 2-(N-Propargyl-N-phenyl)amino-6-aminofluoran | Green. |
| 2-(N-2-butynyl-N-phenyl)amino-6-aminofluoran | Do. |
| 2-(N-Benzyl-N-phenyl)amino-6-aminofluoran | Greenish blue black. |
| 2-(N-o-Nitrobenzyl-N-phenyl)amino-6-aminofluoran | Do. |
| 2-(N-Propargyl-N-phenyl)amino-6-ethylaminofluoran | Greenish black. |
| 2-(N-2-butynyl-N-phenyl)amino-6-ethylaminofluoran | Do. |
| 2-(N-Benzyl-N-phenyl)amino-6-ethylaminofluoran | Greenish blue black. |
| 2-(N-p-Bromobenzyl-N-phenyl)amino-6-methylaminofluoran | Do. |
| 2-(N-Allyl-N-phenyl)amino-6-dimethylaminofluoran | Greenish black. |
| 2-(N-Crotyl-N-phenyl)amino-6-dimethylaminofluoran | Do. |
| 2-(N-Cinnamyl-N-phenyl)amino-6-dimethylaminofluoran | Do. |
| 2-N-Methyl-N-propargylamino-6-diethylaminofluoran | Green. |
| 2-N-Methyl-N-propargylamino-6-dimethylaminofluoran | Do. |
| 2-(N-o-Chlorobenzyl-N-phenyl)amino-6-dimethylaminofluoran | Greenish black. |
| 2-(N-o-Methoxybenzyl-N-phenyl)amino-6-dimethylaminofluoran | Do. |
| 2-(N-Propargyl-N-phenyl)amino-6-diethylaminofluoran | Do. |
| 2-(N-2-Butynyl-N-phenyl)amino-6-diethylaminofluoran | Do. |
| 2-(N-Benzyl-N-phenyl)amino-6-diethylaminofluoran | Do. |
| 2-(N-p-Bromobenzyl-N-phenyl)amino-6-diethylaminofluoran | Do. |
| 2-(N-Allyl-N-phenyl)amino-6-dipropylaminofluoran | Do. |
| 2-(N-Crotyl-N-phenyl)amino-6-dipropylaminofluoran | Do. |
| 2-(N-Cinnamyl-N-phenyl)amino-6-dipropylaminofluoran | Do. |
| 2-(N-o-Chlorobenzyl-N-phenyl)amino-6-dipropylaminofluoran | Do. |
| 2-(N-o-Methoxybenzyl-N-phenyl)-amino-6-dipropylaminofluoran | Do. |
| 2-[N-Crotyl-N-(o-chlorophenyl)]amino-6-diethylaminofluoran | Do. |

| Name of the compound: | Color |
|---|---|
| 2-(N-o-Chlorobenzyl-N-phenyl)amino-6-dipropylamino-4'-chlorofluoran | Do. |
| 2-(N-p-Bromobenzyl-N-phenyl)amino-6-dipropylaminofluoran | Do. |
| 2-(N-o-Methoxybenzyl-N-phenyl)amino-6-dipropylaminofluoran | Do. |
| 2,2'-Iminobis(6-aminofluoran) | Blue-Greenish black. |
| 2,2'-Iminobis(6-ethylaminofluoran) | Greenish black. |
| 2,2'-Iminobis(6-dimethylaminofluoran) | Do. |
| 2,2'-Iminobis(6-diethylaminofluoran) | Do. |
| 2,2'-Iminobis(6-dipropylaminofluoran) | Do. |
| 2,2'-N-Methyliminobis(6-ethylaminofluoran) | Green. |
| 2,2'-N-Methyliminobis(6-dimethylaminofluoran) | Do. |
| 2,2'-N-Ethyliminobis(6-dimethylaminofluoran) | Do. |
| 2,2'-N-Ethyliminobis(6-dimethylaminofluoran) | Do. |
| 2,2'-N-Allyliminobis(6-dimethylaminofluoran) | Do. |
| 2,2'-N-Propargyliminobis(6-diethylaminofluoran) | Do. |
| 2,2'-N-Cinnamyliminobis(6-diethylaminofluoran) | Do. |
| 2,2'-N-(o-Chlorobenzyl)iminobis(6-dimethylaminofluoran) | Do. |
| 2,2'-Iminobis(3-chloro-6-diethylaminofluoran) | Red. |
| 2,2'-Iminobis(4-methoxy-6-diethylaminofluoran) | Greenish black. |
| 2,2'-Benzyliminobis(3-methyl-6-diethylaminofluoran) | Red. |
| 2,2'-Iminobis(4'-dimethylamino-6-dimethylaminofluoran) | Green. |
| 2,2'-N-(o-Chlorobenzyl)iminobis(6-dimethylaminofluoran) | Do. |
| 2,2'-Iminobis(3-chloro-6-diethylaminofluoran) | Red. |
| 2,2'-Iminobis(4-chloro-6-dimethylaminofluoran) | Greenish black. |
| 2,2'-Benzyliminobis(3-methyl-6-diethylaminofluoran) | Red. |
| 2,2'-Iminobis(4'-dimethylamino-6-dimethylaminofluoran) | Green. |
| 2,2'-Acetyliminobis(6-dimethylaminofluoran) | Red. |
| 2,2'-Actyliminobis(6-diethylaminofluoran) | Do. |
| 2,2'-Benzenesulfonyliminobis(6-diethylaminofluoran) | Do. |
| 2-[bis(p-Chlorobenzyl)amino]-6-dimethylaminofluoran | Green. |
| 2-[bis(p-Chlorobenzyl)amino]-6-diethylaminofluoran | Do. |
| 2-[bis(o-Chlorobenzyl)amino]-6-dimethylaminofluoran | Do. |
| 2-[bis(o-Chlorobenzyl)amino]-6-diethylaminofluoran | Do. |
| 2-[bis(p-Xylyl)amino]-6-dimethylaminofluoran | Do. |
| 2-[bis(o-Xylyl)amino]-6-dimethylaminofluoran | Do. |
| 2-[bis(p-Xylyl)amino]-6-diethylaminofluoran | Do. |
| 2-[bis(o-Xylyl)amino]-6-diethylaminofluoran | Do. |
| 2-(o-Chlorobenzylamino)-6-diethylaminofluoran | Dark green. |
| 2-(p-Chlorobenzylamino)-6-diethylaminoflouran | Do. |
| 2-(o-Xylylamino)-6-diethylaminofluoran | Do. |
| 2-(p-Xylylamino)-6-diethylaminofluoran | Do. |
| 2-(N-Phenyl-N-allylamino)-6-dimethylaminofluoran | Green. |
| 2-(N-Phenyl-N-allylamino)-6-diethylaminofluoran | Do. |
| 2-(N-Propargyl-N-phenylamino)-6-dimethylaminofluoran | Do. |
| 2-(N-Propargyl-N-phenylamino)-6-diethylaminofluoran | Do. |
| 2-(N-Phenylacetylamino)-6-dimethylaminofluoran | Red. |
| 2-(N-Phenylacetylamino)-6-diethylaminofluoran | Do. |
| 2-(N-p-Chlorophenylamino)-6-diethylaminofluoran | Dark green. |
| 2-(N-o-Methylphenylamino)-6-diethylaminofluoran | Do. |
| 2-(N-m-Methoxyphenylamino)-6-diethylaminofluoran | Do. |
| 2-Dibenzylamino-4-methoxy-6-diethylaminofluoran | Green. |
| 2-Dibenzylamino-4-chloro-6-dimethylaminofluoran | Do. |
| 2-Dibenzylamino-4-chloro-6-diethylaminofluoran | Do. |

The invention is illustrated below with reference to Examples, which do not limit the scope of the present invention.

EXAMPLE 1

To 100 g. of chloroform, were added 11.5 g. of 6-diethylamino-2-aminofluoran, 21.0 g. of propargyl bromide and 5.3 g. of sodium carbonate. The mixture was maintained at a temperature of 70° to 80° C. for 5 hours. After completion of the hydrolysis, the reaction mixture was neutralized, filtered, and extracted with 300 g. of benzene. The benzene solution was concentrated to a syrup. The solid substance obtained on cooling was recrystallized from benzene. Yield, 6.5 g.; melting point, 141°–143° C. The product was 6-diethylamino-2-dipropargylaminofluoran of the formula,

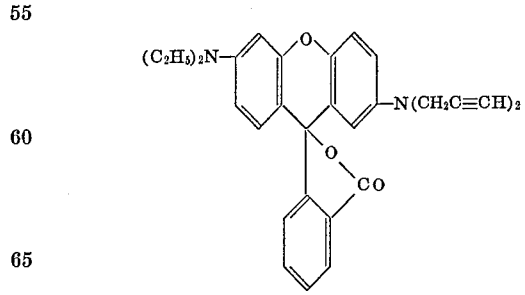

which developed, on silica gel, a dark red color resistant to both light and moisture.

EXAMPLE 2

In a manner similar to that in Example 1, 6-diethylamino-2-(N-diallylamino)flouran (m.p. 118°–120° C.)

of the following formula was obtained from 10 g. of 6-diethylamino-2-aminofluoran and 18 g. of allyl bromide:

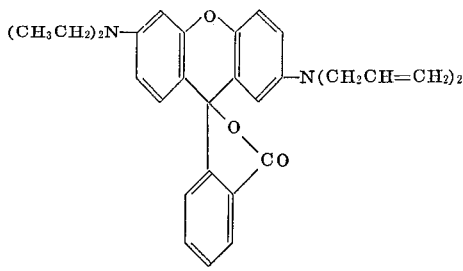

The compound developed a green color on silica gel.

EXAMPLE 3

Into 150 g. of sulfuric acid, was added 30.2 g. of N-benzyl-1-hydroxydiphenylamine followed by 28.5 g. of 2-(2'-hydroxy - 4' - dimethylaminobenzoyl)benzoic acid while maintaining temperature of the mixture at room temperature with cooling. The mixture was then heated with stirring at 50° to 60° C. for 6 hours. After completion of the reaction, the reaction mixture was cooled and then poured into 800 g. of ice water to precipitate a solid which was collected by filtration and, if necessary, neutralized with an alkali, again filtered and washed with cold water. The colored solid was heated with stirring in 500 g. of chlorobenzene at 90° C. for one hour, decolored with 6.5 g. of an activated carbon and then concentrated to obtain a white solid product in a yield of 65.3%. The solid product was recrystallized from a mixed solvent containing n-hexane and benzene, to obtain 2-(N-phenyl - N - benzylamino)-6-dimethylaminofluoran of the formula,

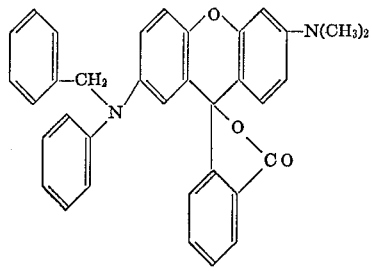

The compound developed a greenish black color on silica gel.

EXAMPLE 4

In a manner similar to that in Example 3, using various 2-(2'-hydroxy-4'-aminobenzoyl)benzoic acid derivatives and 4-aminophenol derivatives in place of 2-(2'-hydroxy-4-dimethylaminobenzoyl)benzoic acid and 4-(N-phenylbenzylamino)phenol respectively, similar fluoran derivatives were obtained as shown in the following table, in which are also shown colors developed by each compound on silica gel.

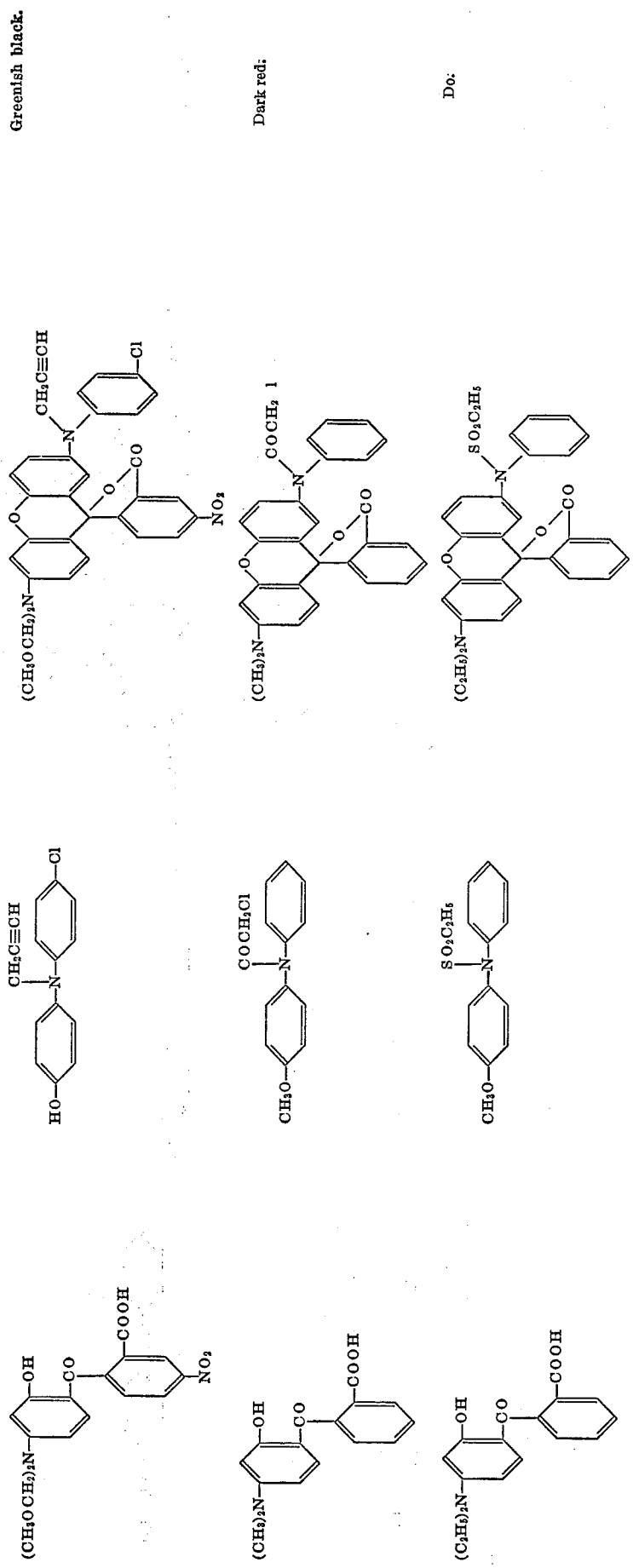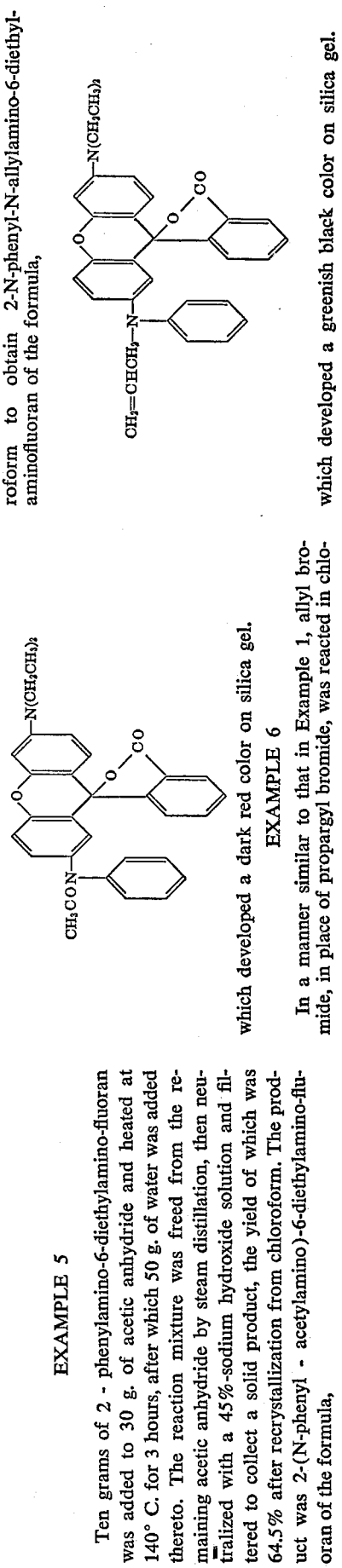

EXAMPLE 5

Ten grams of 2 - phenylamino-6-diethylamino-fluoran was added to 30 g. of acetic anhydride and heated at 140° C. for 3 hours, after which 50 g. of water was added thereto. The reaction mixture was freed from the remaining acetic anhydride by steam distillation, then neutralized with a 45%-sodium hydroxide solution and filtered to collect a solid product, the yield of which was 64.5% after recrystallization from chloroform. The product was 2-(N-phenyl - acetylamino)-6-diethylamino-fluoran of the formula, roform to obtain 2-N-phenyl-N-allylamino-6-diethyl-aminofluoran of the formula, which developed a greenish black color on silica gel.

which developed a dark red color on silica gel.

EXAMPLE 6

In a manner similar to that in Example 1, allyl bromide, in place of propargyl bromide, was reacted in chlo-

EXAMPLE 7

To 50 g. of concentrated sulfuric acid, was added at room temperature, i.e. 25° to 30° C., 2.01 g. of 4,4'-dihydroxydiphenylamine and 6.27 g. of 2-(4'-diethylamino-2'-hydroxybenzoyl)benzoic acid and the mixture was stirred at room temperature for 2 days. After completion of the reaction, the reaction mixture was poured into 1,000 g. of water with stirring, whereby greenish black precipitates were formed. The precipitates were collected by filtration, then preferably again stirred in 1.0%-sodium hydroxide solution, filtered and washed with water. The solid product obtained was recrystallized from chloroform or benzene to give a white solid product melting at 204° C. in a yield of 47%. The product was 2,2'-iminobis(6-diethylaminofluoran) of the formula,

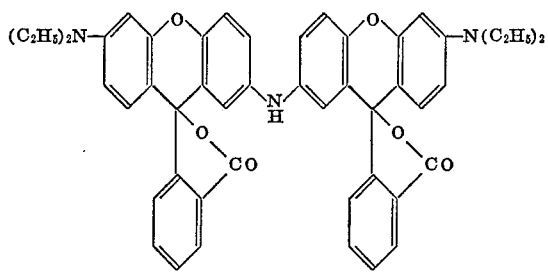

which developed a greenish black color on silica gel.

EXAMPLE 8

Example 7 was repeated except that 2.29 g. of 4,4'-dimethoxydiphenylamine was used in place of 4,4'-dihydroxydiphenylamine. The same 2,2'-iminobis(6-diethylaminofluoran) was obtained.

EXAMPLE 9

In 100 g. of 90%-sulfuric acid, were dissolved 2.15 g. of N-methyl-4,4'-dihydroxydiphenylamine and 6.16 g. of 2-(4'-dimethylamino-2'-hydroxybenzoyl)-benzoic acid, and the solution was kept at 70–80° C. for 5 hours. After completion of the reaction, the reaction mixture was discharged into 1,000 g. of water, and, if necessary, neutralized with dilute sodium hydroxide solution. The precipitates were separated by filtration, washed with water, and treated as in Example 7 to obtain a white solid product in a yield of 38%. The product was 2,2'-methyliminobis(6-dimethylaminofluoran) of the formula,

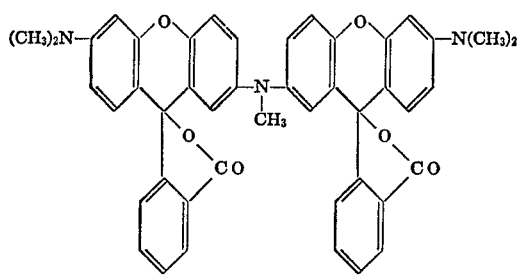

which developed a green color on silica gel.

EXAMPLE 10

In a manner similar to that in Example 7 using various 2-(4'-amino-2'-hydroxybenzoyl)benzoic acid derivatives and diphenylamine derivatives in place of 2 - (4' - diethylamino - 2' - hydroxybenzoyl)benzoic acid and 4,4'-dihydroxydiphenylamine respectively, similar fluoran derivatives were obtained as shown in the following table, in which are also shown colors developed by each compound on silica gel.

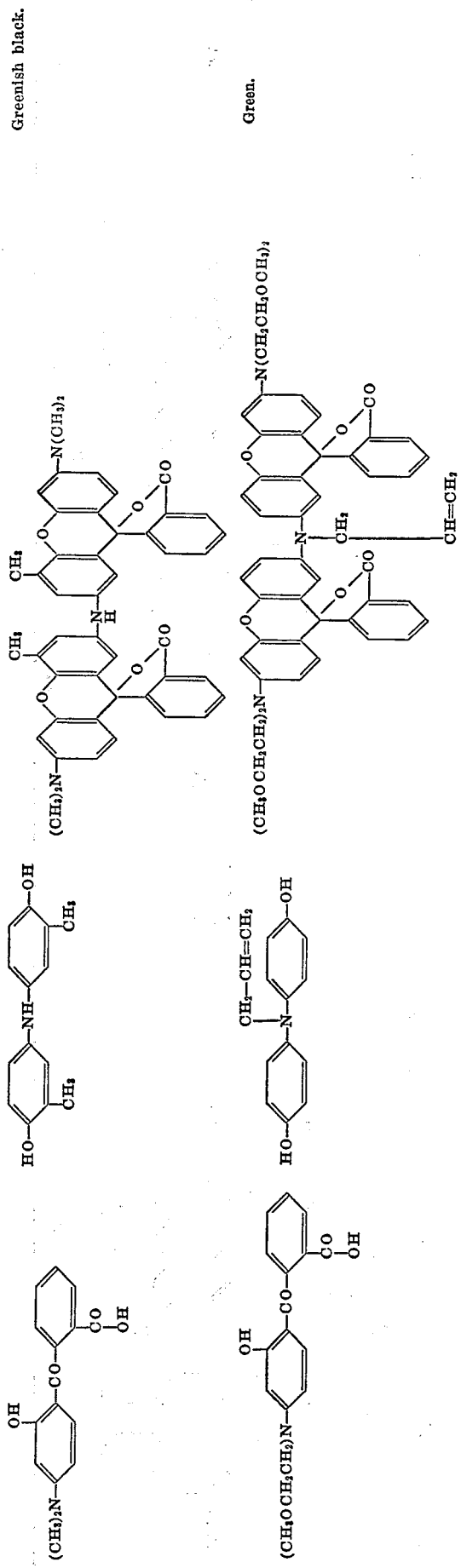

EXAMPLE 11

Ten grams of 2,2'-iminobis(6-diethylamino-fluoran) was heated in 30 g. of acetic anhydride at 80° C. for 3 hours. The reaction mixture was freed from most of the acetic anhydride by applied vacuum and from the remaining acetic anhydride by steam distillation. After neutralization, the resulting solid product was collected by filtration and recrystallized from benzene. The yield of the product was 65.8%. The product was 2,2'-acetyl-iminobis(6-diethylaminofluoran) of the formula,

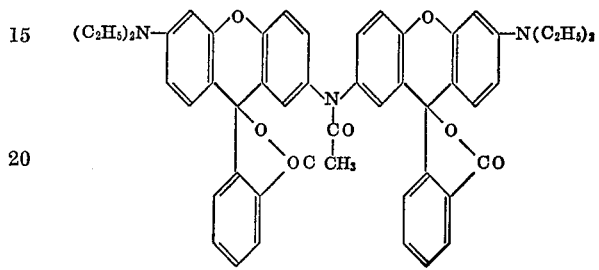

which developed a dark red color on silica gel.

EXAMPLE 12

In 30 g. of N,N-dimethylformamide, were dissolved 7.55 g. of 2,2'-iminobis(6-diethylaminofluoran) obtained in Example 7 and 2.2 g. of benzyl bromide, and the solution was kept at 70° to 80° C. for 3 hours. Then, sodium hydrogencarbonate was added thereto and the solution was further kept at the same temperature for two hours. Then, 200 g. of water was added to the reaction mixture and the unreacted benzyl bromide was removed as well as decomposed in part by steam distillation while keeping the mixture slightly alkaline. After cooling, the solid substance precipitated from the alkaline medium was filtered and extracted with about 100° of a mixture of benzene and chloroform (3:2 by volume). The extract solution was concentrated to obtain a white solid product in a yield of 75.1%, which, if necessary, was recrystallized from a mixture of benzene and cyclohexane (1:1 by volume). The product was 2,2'-benzyliminobis(6-diethylaminofluoran) of the formula,

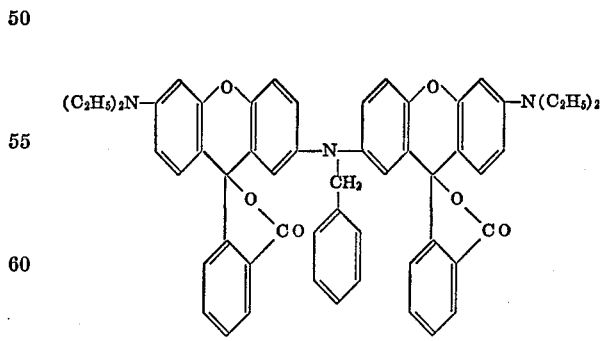

which developed a green color on silica gel.

EXAMPLE 13

According to the procedures of Examples 11 and 12, various fluoran derivatives were reacted with acylating, alkylating or sulfonylating agent to obtain similar fluoran compounds to those in Examples 11 and 12, as shown in the following table, in which were also shown colors developed on silica gel by each compound.

| Fluoran derivatives (starting material) | | Product | Color |
|---|---|---|---|
| 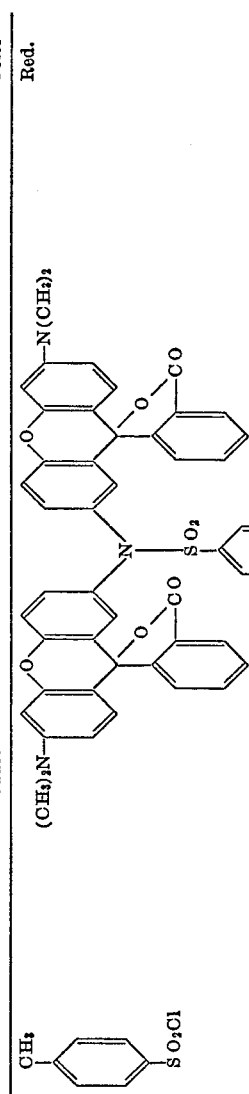 | 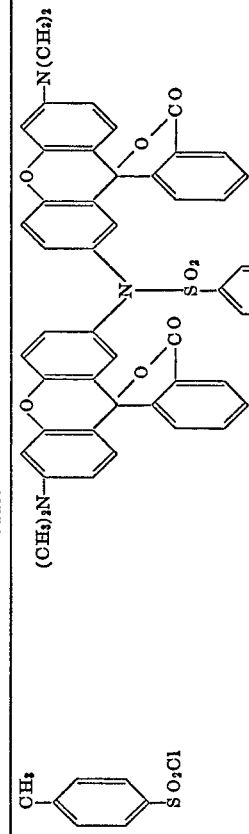 | 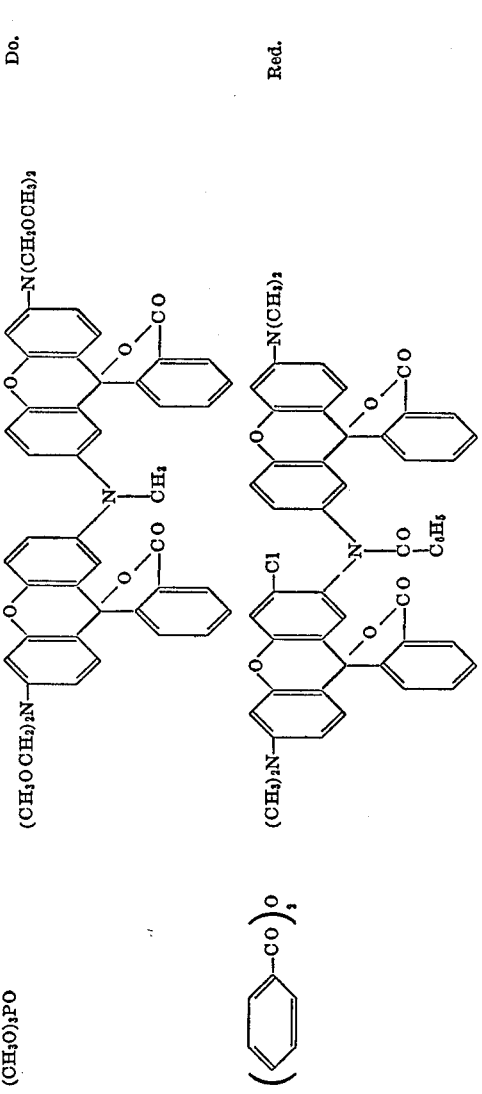 | Red. |
| | | | Green. |
| | | | Do. |
| 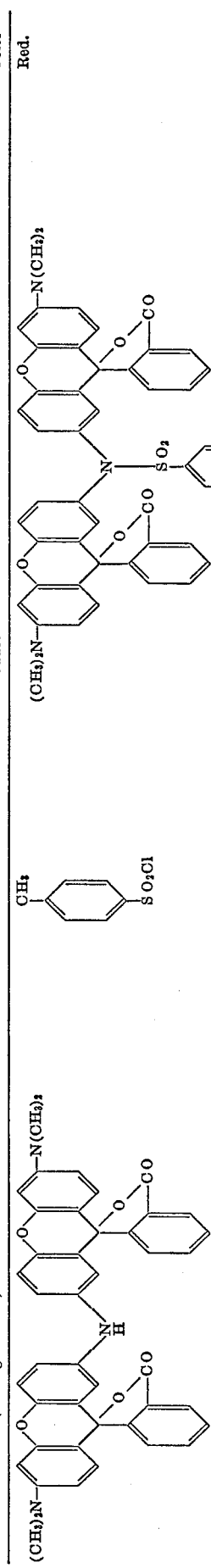 | 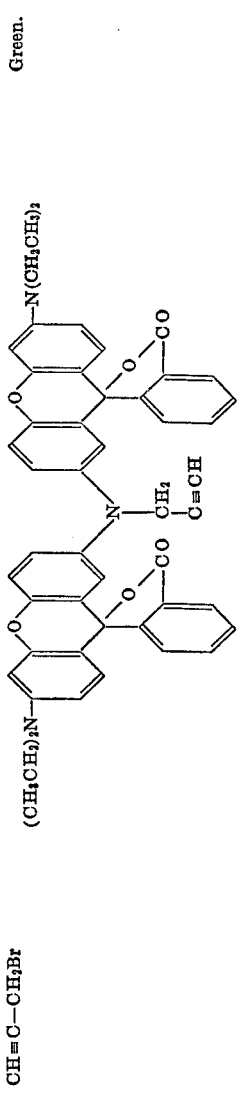 | 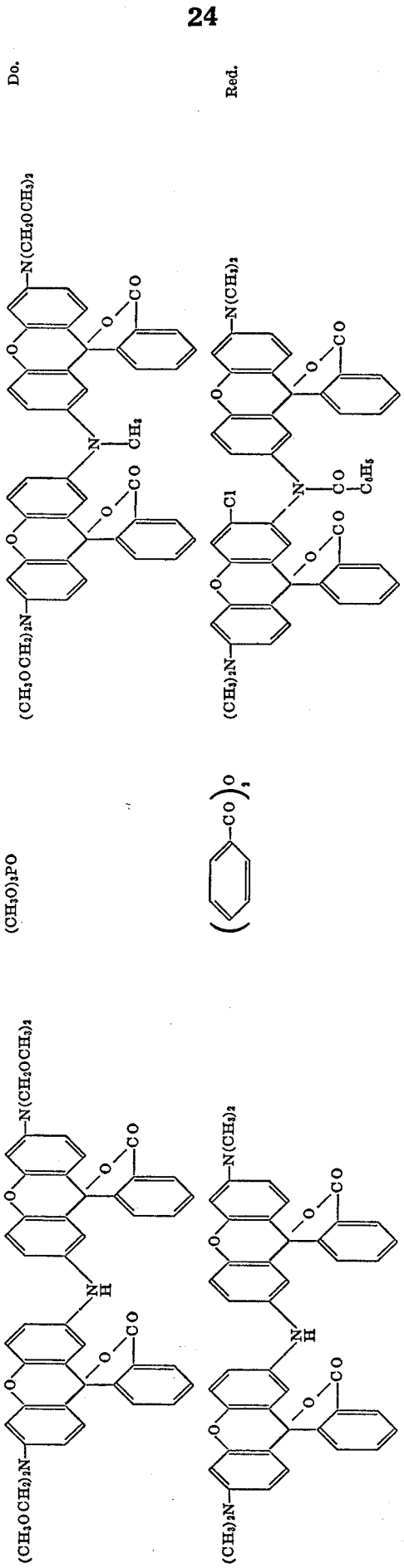 | Red. |
| | 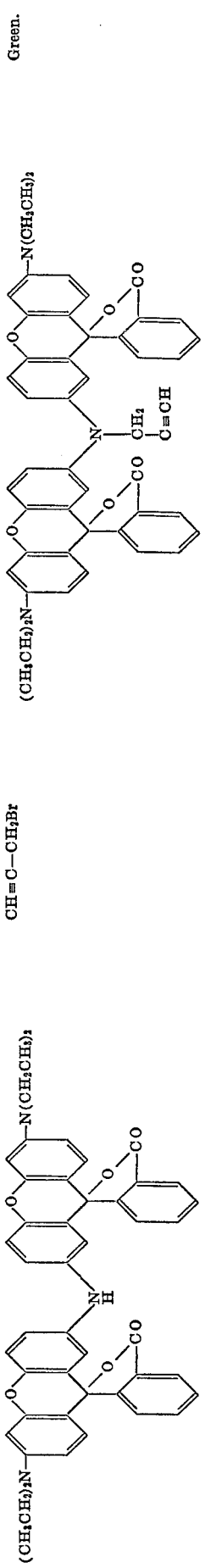 | | |

EXAMPLE 14

In 50 g. of N,N-dimethylformamide, were dissolved 7.2 g. of 2-amino-6-diethylaminofluoran and 8.2 g. of p-chlorobenzyl bromide, and the solution was kept at 70° to 80° C. for 3 hours. Then, sodium hydrogencarbonate was added thereto and the solution was further kept at the same temperature for two hours. Then, 200 g. of water was added to the reaction mixture and the unreacted p-chlorobenzyl bromide was removed as well as decomposed in part by steam distillation while keeping the mixture slightly alkaline. After cooling, the solid substance precipitated from the alkaline medium was filtered and extracted with about 600 g. of a mixture of benzene and chloroform (3:2 by volume). The extract solution was concentrated to obtain a white solid product in a yield of 65.0%, which was, if necessary, recrystallized from a mixture of benzene and cyclohexane (1:1 by volume). The purified product had a melting point of 129°–130° C., and its visible ray absorption spectrum showed $\lambda_{max}$ at 433,598 and 459 m$\mu$ (in acetic acid). The compound was 2-N,N-bis(p-chlorobenzyl)amino - 6 - diethylaminofluoran of the formula,

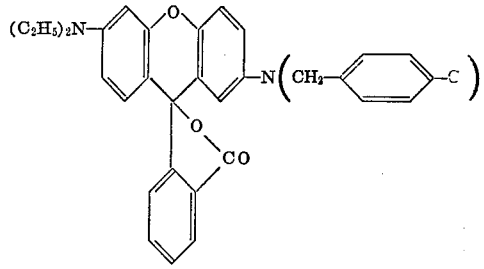

which developed a dark green color on silica gel.

EXAMPLE 15

In a similar manner to that in Example 14, several fluoran compounds were obtained as shown in the following table, in which are also shown melting points and colors developed on silica gel by each compound.

| Compound | Melting point, °C. | Color developed |
|---|---|---|
| (CH₃CH₂)₂N—[fluoran]—N(CH₂—C₆H₄—Cl)₂ (o-Cl) | 179–180 | Blackish green. |
| (CH₃CH₂)₂N—[fluoran]—N(CH₂—C₆H₄—CH₃)₂ | 191–192 | Do. |
| (CH₃CH₂)₂N—[fluoran(CH₃)]—N(CH₂—C₆H₅)₂ | 144–145 | Reddish violet. |
| (CH₃CH₂)₂N—[fluoran(OCH₃)]—N(CH₂—C₆H₅)₂ | 81–83 | Green. |
| (CH₃CH₂)₂N—[fluoran(Cl)]—N(CH₂—C₆H₅)₂ | 89–90 | Do. |

In the present invention, the above-said known technique of making recording sheet is utilized so that the above-mentioned fluoran compounds may be used as the coloring material each alone or in combination with other known coloring materials to make a recording sheet capable of producing red, green or black image color.

In the present invention, incorporation of metals or metal compounds into the electron-acceptor is advantageous in further improving color development, light fastness, and water resistance of the image.

Effective metals and metal compounds are manganese, nickel, cobalt, iron, zinc, copper, cadmium, mercury, silver and platinum. Particularly preferable metal compounds include salts and acidic salts such as copper sulfate, ferrous sulfate, manganese sulfate, cobalt sulfate, zinc acetate, and nickel acetate; basic salts such as cadmium hydroxide; and oxides such as zinc oxide.

The techniques of making the pressure sensitive copying paper are explained below in the following Examples.

EXAMPLE 16

In 100 parts by weight of trichlorinated diphenyl, was dissolved at 100° C. 3 parts by weight of 6-diethyl-amino-2-dipropargylaminofluoran as the electron-donating color-forming material. In a separate vessel, for use as the encapsulating agent 25 parts by weight of pigskin gelatin having an isoelectric point of 8 and 25 parts by weight of gum arabic were dissolved in 300 parts by weight of warm water at 50° C. Into the resulting solution of gelatin-gum arabic mixture, was added with stirring the above-obtained oil containing the color-forming material to form an emulsion. The resulting emulsion was diluted with 1,000 parts by weight of warm water and pH was adjusted to 4 to 4.3 by adding dropwise acetic acid, whereupon the encapsulating material deposited around the oil particles to form capsules in sol-stage. This mixture was cooled to about 10° C. to transform the capsules into gel-stage and then cured by adding 10 parts by weight of a 25%-aqueous solution of glutaraldehyde. The resulting coating liquid containing capsules was coated on one side of a sheet of paper weighing 45 g./m.$^2$ to form a coated layer, 5 g./m.$^2$ on dry basis, of color-forming material. The other side of the sheet was coated with 5 g./m.$^2$ (dry basis) of the electron acceptor by applying a coating liquid which was prepared by dispersing 100 parts by weight of p-phenylphenol-formaldehyde resin in 200 parts by weight of water and further adding thereto 30 parts by weight of a styrene-butadiene latex (50% solids). Several sheets of the resulting pressure-sensitive copying paper were laid one over another so that the layer of electron-donating color-forming material and the layer of electron-acceptor will face each other. On applying an impression, a duplicated image in dark red color was obtained on the side of each sheet, which had been coated with the electron-accepting substance. The image neither discolored nor faded on contact with water or alcohol, or an exposure to direct sunlight.

EXAMPLE 17

A pressure-sensitive paper was obtained in the same manner as in Example 16 except that 2-di-allylamino-6-diethylaminofluoran was used as the electron-donating color-forming material. The image developed was blackish green and extremely resistant to sunlight and moisture.

Similar pressure sensitive paper was obtained by using compounds as shown in the following table, in which are given colors of the image developed by each compound.

| Electron-donating color-forming material | Color of image |
|---|---|
| $(C_2H_5)_2N$-[xanthene-Cl]-$N(CH_2CH=CH_2)_2$, CO-phenyl | Dark green. |
| $(C_2H_5)_2N$-[xanthene-$CH_3$]-$N(CH_2C\equiv CH)_2$, CO-phenyl | Dark red. |
| $(C_2H_5)_2N$-[xanthene-Cl]-$N(CH_2$-phenyl$)_2$, CO-phenyl | Dark green. |
| $(CH_3OCH_2)_2N$-[xanthene-$OCH_3$]-$NH(CH_2CH=CH)$, CO-phenyl | Do. |

EXAMPLE 18

Example 16 was repeated except that 3 parts by weight of 6-dimethylamino-2-N-dicinnamylaminofluoran and 3 parts by weight of 2-methyl-6-diethylaminofluoran were used as the electron-donating color-forming material. A pressure-sensitive copying paper which develops a black color was obtained.

EXAMPLE 19

In 100 parts by weight of trichlorodiphenyl, were dissolved at 100° C. 4 parts by weight of 6-diethylamino-4-bromo-2-dicinnamylaminofluoran. The resulting oil containing the color-forming material was added to a mixed solution comprising 500 parts by weight of a 10%-gelatin solution and 500 parts by weight of a 10%-gum arabic solution, to form an emulsion, while maintaining the temperature at 60° C. The emulsion was then diluted with 1,000 parts by weight of warm water at 40° C. The pH value of the diluted emulsion was adjusted to 4 to 4.3 by slowly adding dropwise with continued stirring a 10%-acetic acid solution while maintaining the temperature at 50° C. To the resulting emulsion, which had been cooled to and maintained at a temperature below 15° C., was slowly added 500 parts by weight of a 20%-dispersion of titanium oxide, 0.2 to 0.4µ in particle diameter, then followed by 100 parts by weight of a 10%-formaldehyde solution. Thereafter, pH of the emulsion was adjusted to 10 to 10.5 by slowly adding dropwise a 10%-sodium hydroxide solution (the resulting emulsion is referred to as "emulsion A"). In another vessel, 40 parts by weight of a 10%-sodium hydroxide solution and 200 parts by weight of an activated acid clay were dispersed in 400 parts by weight of water, and then 200 parts by weight of a 10%-polyvinyl alcohol solution was dispersed therein. The resulting dispersion was mixed uniformly with the above-said emulsion A to form the coating preparation. A sheet of base paper weighing 40 g./m.² was coated on one side with said coating preparation so as to form a coated layer of 7 g./m.² (dry basis), which was then dried. The resulting pressure-sensitive copying paper was a "self-contained" type, and by impression on the coated surface, the impressed part developed a clear image blackish green in color, which neither discolored nor faded on exposure to sunlight or moisture.

EXAMPLE 20

Pressure-sensitive paper could be obtained by using the compounds shown in the following table.

| Electron-donating color-forming material | Color of image |
|---|---|
| 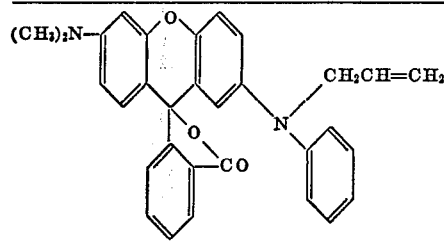 | Blackish green. |
| 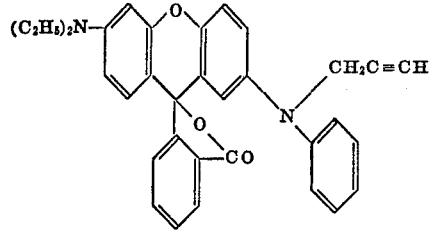 | Do. |
| 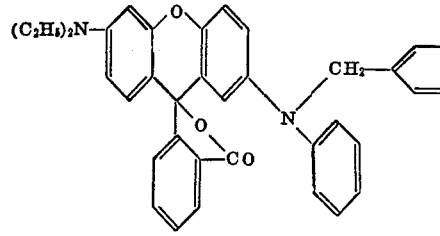 | Do. |
| 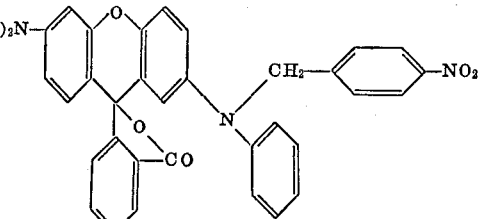 | Do. |
| 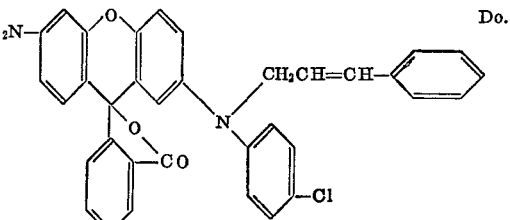 | Do. |

EXAMPLE 21

A pressure-sensitive copying paper was obtained in the same manner as in Example 19, except that 3 parts by weight of 2-(N-phenyl-N-cinnamyl)amino-6-dimethylaminofluoran and 3 parts by weight of 2-methyl-6-diethylaminofluoran capable of developing a red color were used and dissolved in 100 parts by weight of trichlorinated diphenyl. The image obtained on the side of the sheet where the electron-accepting substance had been coated was black in color, which maintained the initial color unchanged after storage for a long period.

EXAMPLE 22

A pressure-sensitive copying paper was obtained in the same manner as in Example 19, except that 2,2'-iminobis(6-diethylaminofluoran) was used as the color-forming material. The image produced by said copying paper was blackish green in color, which was good in light fastness and moisture resistance, no fading of the image having been observed on exposure to sunlight and moisture.

EXAMPLE 23

A number of pressure-sensitive paper were obtained in a similar manner to that in Example 22, using fluoran compounds shown in the following table in place of 2,2'-iminobis(6-diethylaminofluoran). The colors developed by said pressure-sensitive paper were as shown in the table.

| Electron-donating color-forming material | Color of image |
|---|---|
| 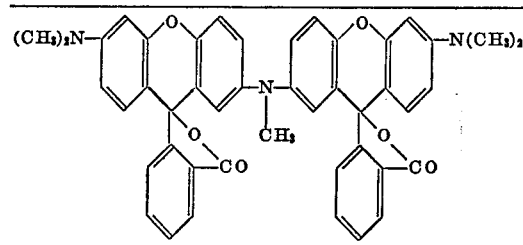 | Blackish green. |
| 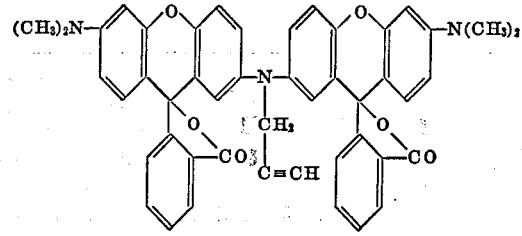 | Do. |

| Electron-donating color-forming material | Color of image |
|---|---|
| (structure: bis-dimethylamino xanthene linked by NH, with phthalide groups) | Do. |
| (structure: bis-diethylamino xanthene linked by N-COCH$_3$, with phthalide groups) | Red. |
| (structure: bis-dimethylamino xanthene linked by N-CH$_2$-phenyl, with phthalide groups) | Green. |
| (structure: bis-diethylamino dibromo xanthene linked by NH, with phthalide groups) | Greenish black. |
| (structure: bis-(methoxyethyl)amino dimethyl xanthene linked by N-CH$_2$-CH=CH$_2$, with phthalide groups) | Green. |
| (structure: bis-diethylamino dimethyl xanthene linked by NH, with phthalide groups) | Greenish black. |

EXAMPLE 24

In 100 parts by weight of trichlorinated diphenyl, was dissolved at 100° C. 3 parts by weight of 2-[N,N-bis(p-chlorobenzylamino)]-6-diethylaminofluoran as the electron-donating color-forming material. In another vessel, to prepare an encapsulating agent 25 parts by weight of the pigskin gelatin having an isoelectric point of 8 and 25 parts by weight of gum arabic were dissolved in 300 parts by weight of warm water at 50° C. Into the solution of gelatin-gum arabic mixture, was added with stirring the above-obtained oil containing the color-forming material to form an emulsion. The emulsion was diluted with 1,000 parts by weight of warm water and pH was adjusted to 4 to 4.3 by adding dropwise acetic acid, whereupon the encapsulating material deposited around the oil particles to form sol-stage capsules. This mixture was cooled to about 10° C. to convert the capsules into gel-stage and then cured by adding 10 parts by weight of a 25%-aqueous solution of glutaraldehyde. The resulting coating preparation containing capsules was coated on one side of a sheet of paper weighing 45 g./m.² to form a coated layer, 5 g./m.² on dry basis, of electron-donating color-forming material. The other side of the sheet was coated with 5 g./m.² (dry basis) of the electron-accepting substance by applying a coating preparation which was prepared by dispersing 100 parts by weight of an acid clay as the electron-acceptor in 200 parts by weight of water and further adding thereto 30 parts by weight of a styrene-butadiene latex (50% solids). Several sheets of the resulting pressure-sensitive copying paper were laid one over another so that the layer of electron-donating color-forming material and the layer of electron-acceptor will face each other. On applying an impression, a duplicated clear image in blackish green color was obtained on the side of each sheet, which had been coated with the electron-accepting substance. The image neither discolored nor faded on contact with water or alcohol, or on exposure to direct sunlight.

EXAMPLE 25

A pressure-sensitive copying paper was obtained in the same manner as in Example 24, except that 3 parts by weight of 2 - [N,N-bis(o-chlorobenzyl)amino]-6-diethyl-aminofluoran, 2 parts by weight of 3-diethylamino-6-methylfluoran capable of producing a red color, and 1 part by weight of N-benzoyl-Methylene Blue were used as the electron-donating color-forming material and were dissolved in 100 parts by weight of trichlorinated diphenyl. The image obtained on the side of the sheet where the electron-acceptor had been coated was black in color, which retained the initial color unchanged after storage for a long period.

EXAMPLE 26

In 100 parts by weight of trichlorodiphenyl, were dissolved at 100° C. 2 parts by weight of 3-diethylamino-6-methylfluoran, 1 part by weight of N-benzoyl-Methylene Blue and 3 parts by weight of 2-(N,N-di-p-xylylamino)-6-diethylaminofluoran. The resulting oil containing the color-forming materials was added to a mixed solution comprising 500 parts by weight of a 10%-gelation solution and 500 parts by weight of a 10%-gum arabic solution, to form an emulsion, while maintaining the temperature at 60° C. The emulsion was then diluted with 1,000 parts by weight of warm water at 40° C. The pH value of the diluted emulsion was adjusted to 4 to 4.3 by slowly adding dropwise with continued stirring a 10%-acetic acid solution while maintaining the temperature at 50° C. To the resulting emulsion, which had been cooled to and maintained at a temperature below 15° C., was slowly added 500 parts by weight of a 20%-dispersion of titanium oxide, 0.2 to 0.4µ in particle diameter, then followed by 100 parts by weight of a 10%-formaldehyde solution. Thereafter, pH of the emulsion was adjusted to 10 to 10.5 by slowly adding dropwise a 10%-sodium hydroxide solution (the resulting emulsion is referred to as "preparation A." In another vessel, 40 parts by weight of a 10%-sodium hydroxide solution and 200 parts by weight of an activated acid clay were dispersed in 400 parts by weight of water, and then 200 parts by weight of a 10%-polyvinyl alcohol solution was dispersed therein. The resulting dispersion was mixed uniformly with the above-said preparation A to form the coating preparation. A sheet of base paper weighing 40 g./m.² was coated on one side with said coating preparation so as to form a coated layer of 7 g./m.² (dry basis), which was then dried. The resulting pressure-sensitive copying paper was a "self-contained" type, and by impression on the coated surface, the impressed part developed a clear image in black color, which neither discolored nor faded on exposure to sunlight or moisture.

The coating compositions, which contained the electron-acceptor, in the foregoing Examples can be replaced by the following compositions, to obtain also satisfactory results.

Parts by weight (a)

| | |
|---|---|
| Water | 200 |
| Acid clay | 100 |
| Cadmium hydroxide | 10 |
| Styrene-butadiene latex | 20 |

(b)

| | |
|---|---|
| Water | 200 |
| Acid clay | 100 |
| Maganese sulfate | 5 |
| Styrene-butadiene latex | 15 |

(c)

| | |
|---|---|
| Water | 200 |
| Acid clay | 100 |
| Copper sulfate | 3 |
| Latex | 10 |

(d)

| | |
|---|---|
| Water | 200 |
| Acid clay | 100 |
| Ferrous sulfate | 3 |
| Latex | 15 |

(e)

| | |
|---|---|
| Water | 200 |
| Acid clay | 100 |
| Zinc acetate | 10 |
| Latex | 20 |

(f)

| | |
|---|---|
| Water | 200 |
| Acid clay | 100 |
| Cobalt sulfate | 5 |
| Latex | 15 |

(g)

| | |
|---|---|
| Water | 200 |
| Acid clay | 100 |
| Nickel acetate | 5 |
| Latex | 15 |

(h)

| | |
|---|---|
| Water | 200 |
| Attapulgite | 100 |
| Zinc oxide | 5 |
| Latex | 15 |

EXAMPLE 27

In 100 parts by weight of trichlorodiphenyl, was dissolved at 100° C. 4 parts by weight of 6-dimethyl-amino-2-dipropargylaminofluoran. The resulting oil containing the color-forming material was added to 500 parts by weight of a 7%-gelatin solution to form an emulsion, while maintaining the temperature at 60° C. To the emulsion was added 350 parts by weight of a 10%-gum arabic solution followed by 550 parts by weight of warm water. The pH value of the emulsion was adjusted to 4.0 to 4.3 by slowly adding dropwise with continued stirring a 10%-acetic acid solution while maintaining the temperature at 50° C. To the resulting emulsion, which had been cooled to and maintained at a temperature, was slowly added with continued stirring 200 parts by weight of a 50%-dispersion of titanium oxide, 0.2 to 0.5µ in particle diameter, then followed by 38 parts by weight of 37%-formalin. Thereafter, pH of the emulsion was adjusted to 10.0 to 10.5 by adding dropwise a 10%-sodium hydroxide solution (the resulting dispersion is referred to as "preparation A"). In another vessel, 20 parts by weight of zinc oxide and 40 parts by weight of a 28%-aqueous ammonia were added to 400 parts by weight of water, and then 200 parts by weight of an acid clay was dispersed therein. After 1 part by weight of sodium alginate had been dissolved in said dispersion, 100 parts by weight of a 10%-polyvinyl alcohol solution was added thereto and the whole dispersion was thoroughly mixed. The resulting dispersion was mixed with the above-said preparation A. To the combined dispersion, were further added 250 parts by weight of a 10%-polyvinyl alcohol solution and 100 parts by weight of powdered pulp, to obtain a coating preparation. A sheet of base paper weighing 40 g./m.² was coated on one side with said coating preparation so as to form a coated layer of 10 g./m.² (dry basis), and then dried. The resulting pressure-sensitive copying paper was a "self-contained" type and by impression on the coated surface, the impressed part developed an image, deep red in color. This copying paper was excellent in instantaneous color development and the color neither discolored nor faded on exposure to sunlight or moisture.

EXAMPLE 28

A thermo-responsive (or heat-sensitive) recording material is manufactured by the following manner. 20 Parts by weight of 2,2'-benzyliminobis(6-diethylaminofluoran), 15 parts by weight of 3-diethylamino-6-methylfluoran, 150 parts by weight of a 10% aqueous solution of polyvinyl alcohol, and 65 parts by weight of water were dispersed in high shear mixer (Component A). 35 Parts by weight of Bisphenol A, 150 parts by weight of a polyvinyl alcohol solution, and 65 parts by weight of water were dispersed in high shear mixer (Component B). 3 Parts by weight of Component A and 67 parts by weight of Component B were combined and coated on the paper sheet at a dry weight of 5 g./m.². The resulting sheet may be used alone as a copy-receiving sheet by being served with a pattern of heat from front or back, as by a thermographically-heated original document, by trace of a hot stylus, by hot type, or by any other means giving a heat pattern by conduction. Developed image of this sheet is clear black in color.

What is claimed is:

1. A compound having the formula

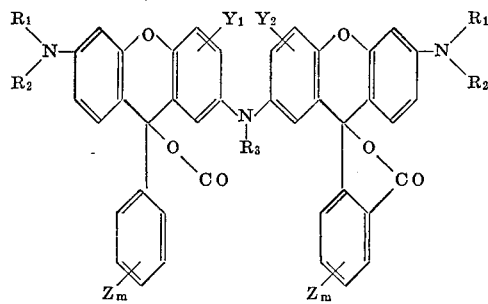

wherein $Y_1$ and $Y_2$ are selected from the group consisting of hydrogen, halogen, $C_1$–$C_4$ alkyl and $C_1$–$C_4$ alkoxy, Z is selected from the group consisting of hydrogen, lower alkyl substituted amino and halogen, $R_1$ and $R_2$ are selected from the group consisting of hydrogen, $C_1$–$C_4$ alkyl, $C_1$–$C_4$ alkoxy substituted $C_1$–$C_4$ alkyl, benzyl, halo-, alkoxy-, nitro- and alkyl-substituted benzyl, $R_3$ is selected from the group consisting of hydrogen, $C_1$–$C_4$ alkyl,

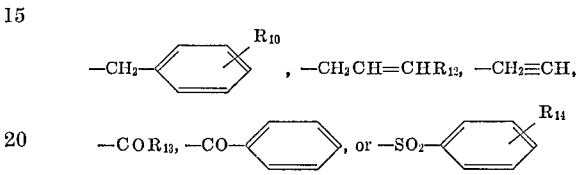

$R_{10}$ is selected from the group consisting of hydrogen, halogen, nitro, $C_1$–$C_4$ alkyl, or $C_1$–$C_4$ alkoxy, $R_{12}$ is selected from the group consisting of hydrogen or phenyl, $R_{13}$ is selected from the group consisting of $C_1$–$C_4$ alkyl and $R_{14}$ is selected from the group consisting of hydrogen, and $C_1$–$C_4$ alkyl.

2. 2,2'-Iminobis(6-dimethylaminofluoran).
3. 2,2'-Iminobis(6-diethylaminofluoran).
4. 2,2'-Methyliminobis(6-diethylaminofluoran).
5. 2,2'-Acetyliminobis(6-dimethylaminofluoran).
6. 2,2'-Acetyliminobis(6-diethylaminofluoran).
7. 2,2' - Benzenesulfonyliminobis(6 - diethylaminofluoran).

References Cited
UNITED STATES PATENTS 3,501,331   3/1970   Kimura et al. _____ 260—335
3,627,787   12/1971  Lin _____ 260—335
3,669,711   6/1972   Kimura et al. _____ 260—335

NORMA S. MILESTONE, Primary Examiner

U.S. Cl. X.R.
117—36.2, 36.8; 260—240

UNITED STATES PATENT OFFICE
CERTIFICATE OF CORRECTION

Patent No. 3,825,561          Dated July 23, 1974

Inventor(s)   Takashi Akamatsu, et al

It is certified that error appears in the above-identified patent and that said Letters Patent are hereby corrected as shown below:

In Column 1, lines 7 and 8, the names of the Assignees should read:

Sumitomo Chemical Company, Limited, Osaka, Japan and

Kanzaki Paper Manufacturing Co., Ltd., Tokyo, Japan

Signed and sealed this 26th day of November 1974.

(SEAL)
Attest:

McCOY M. GIBSON JR.          C. MARSHALL DANN
Attesting Officer            Commissioner of Patents